(12) United States Patent
Bennett

(10) Patent No.: US 7,523,906 B2
(45) Date of Patent: Apr. 28, 2009

(54) LOUDSPEAKER WALL BRACKET

(75) Inventor: Martin Peter Bennett, Surrey (GB)

(73) Assignee: B-Tech International, Ltd. (GB)

( * ) Notice: Subject to any disclaimer, the term of this patent is extended or adjusted under 35 U.S.C. 154(b) by 352 days.

(21) Appl. No.: 10/528,206

(22) PCT Filed: Sep. 17, 2003

(86) PCT No.: PCT/GB03/04013

§ 371 (c)(1),
(2), (4) Date: Mar. 17, 2005

(87) PCT Pub. No.: WO2004/027309

PCT Pub. Date: Apr. 1, 2004

(65) Prior Publication Data

US 2005/0236540 A1     Oct. 27, 2005

(30) Foreign Application Priority Data

Sep. 18, 2002   (GB)   ................................ 0221624.0

(51) Int. Cl.
*A47F 5/00*   (2006.01)
(52) U.S. Cl. .............................. 248/288.51; 248/288.31
(58) Field of Classification Search ............ 248/288.11, 248/288.31, 292.14, 297.21, 181.1, 223.31, 248/223.41, 224.51, 224.7, 481, 288.51; D8/354–355, 363, 373; D14/224; 403/90, 403/114, 115, 131

See application file for complete search history.

(56) References Cited

U.S. PATENT DOCUMENTS

| | | | |
|---|---|---|---|
| 1,086,375 A * | 2/1914 | LaFrance | .................... 248/173 |
| 1,280,013 A | 9/1918 | Goddard | |
| 1,972,246 A * | 9/1934 | Sauer | .......................... 248/481 |
| 4,036,459 A | 7/1977 | Alexander et al. | |
| 4,730,818 A | 3/1988 | Price | |
| 4,765,580 A * | 8/1988 | Wright | .................... 248/181.1 |
| 4,936,533 A * | 6/1990 | Adams et al. | .......... 248/222.11 |
| 5,251,859 A * | 10/1993 | Cyrell et al. | ........... 248/288.51 |
| 5,392,350 A | 2/1995 | Swanson | |
| D433,405 S * | 11/2000 | Vieira | ........................ D14/224 |
| 6,915,996 B2 * | 7/2005 | Lin | ........................ 248/288.51 |
| 7,155,027 B2 * | 12/2006 | Lee | ............................. 381/390 |
| 2004/0202346 A1 * | 10/2004 | Park et al. | .................... 381/386 |
| 2007/0040085 A1 * | 2/2007 | Pincek et al. | .......... 248/288.31 |

OTHER PUBLICATIONS

International Search Report for PCT/GB2003/004013.
Search Report for GB 0221624.0.
Written Opinion for PCT/GB03/04013.
IPER for PCT/GB03/04013.

* cited by examiner

*Primary Examiner*—Gwendolyn Baxter
(74) *Attorney, Agent, or Firm*—Barkume & Associates, P.

(57) ABSTRACT

A wall bracket for a loudspeaker or the like, particularly for use in the home theatre context, and comprising a wall plate (20) arranged for attachment to a wall, the plate having at least a pair of raised, laterally outward projecting flanges (21a, 21b); a bracket base arranged for engaging with the flanges and being thereby held to the wall plate, the bracket base having two substantially similar opposing parts (30, 40) each incorporating a substantially hemispherical socket (34); and a bracket mount (50) arranged for attachment to the loudspeaker etc, the bracket mount incorporating a ball member (51) adapted to be gripped between the bracket base sockets in a variety of configurations.

11 Claims, 2 Drawing Sheets

LOUDSPEAKER WALL BRACKET

Figure 1:
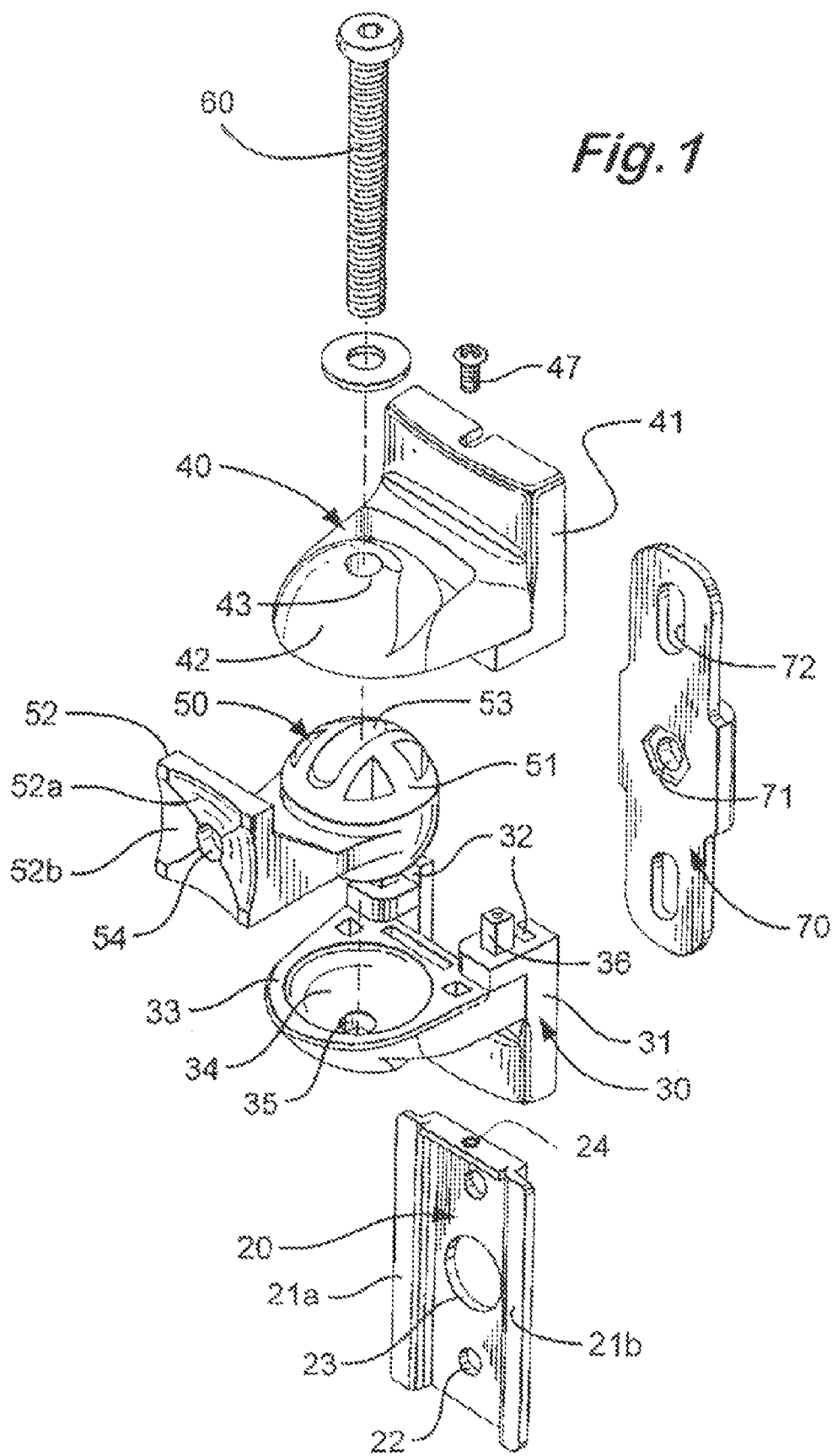

The present invention relates to wall brackets for loudspeakers and the like.

Wall brackets are well known for loudspeakers and typically comprise a plate for attachment to the wall and a ball and a socket arrangement for mounting the loudspeaker, whereby the latter can be pointed in a desired direction.

According to the present invention a wall bracket for a loudspeaker or the like comprises:

a wall plate arranged for attachment to a wall, the plate having at least a pair of raised, laterally projecting flanges;

a bracket base arranged for engaging with the flanges and being thereby held to the wall plate; and a bracket mount arranged for attachment to a loudspeaker or the like;

there being a ball and socket arrangement between the bracket base and the bracket mount whereby the bracket mount may be locked to the bracket base in a variety of configurations.

The invention provides a number of advantages over known such wall brackets. One is aesthetic, in that screws or the like holding the bracket to the wall need not be visible. Another is that neither the bracket configuration nor the wall plate have to be disturbed when the loudspeaker etc is removed from the wall.

For aesthetic and simplicity considerations it is preferred that the flanges project outwards of the wall plate rather than inwards. In a preferred embodiment of the invention the engagement of the bracket base with the projecting flanges is accomplished by sliding the bracket base onto the flanges, which may be in parallel or convergent array. However the bracket base may be arranged to clip over one of the flanges and a grub screw in the bracket base, preferably at the top thereof, used to engage behind an opposing flange.

Another advantage conferred by the projecting flange means of attachment is in readily permitting the use of a substantially two part bracket base. Each of the two parts of the bracket base may include a socket forming part of the said ball and socket arrangement. By this means the ball may be interposed between two substantially hemispherical sockets, and held therebetween in a vice-like manner. Preferably the two parts of the bracket base have interfitting members, for example pegs and associated holes whereby the two parts of the bracket base can be manually held together, with the ball in place, while the wall bracket is assembled. This assembly can then be mounted on the wall plate. A grub screw may be fitted in the bracket base to lock it to the wall plate.

Ideally the ball is pierced in the longitudinal direction, as are the sockets, and the bracket is clamped together by a bolt passing through the two sockets and the ball. The arrangement is preferably such as still to permit the ball to be held so that the loudspeaker etc may have a variety of inclinations with respect to the wall bracket. For example the hole through the ball may be enlarged, at least towards the surface of the ball. The bolt fixing may be an external nut or one nestling within or moulded within one of the two parts of the bracket base. The bolt may have an enlarged head to enable it to be finger tightened. On the other hand the bolt head may interfit a bracket base part or be moulded therewith and the nut may be large enough for finger tightening.

The bracket mount may have a concave mounting surface and will usually incorporate holes or slots for attachment of the loudspeaker etc. Ideally the bracket mount has a mounting surface, which comprises two saddles, one normal to the other, in this way the mount may be aesthetically adapted for attachment to loudspeakers with curved or flat rear or side surfaces. An adapter or suite of adapters may be provided for enabling loudspeakers etc of differing sizes and mounting provisions to be attached to the wall bracket.

It is also convenient if the wall plate has a cable management hole whereby cabling for the loudspeaker etc can be routed therethough and possibly between the two parts of the bracket base, thereby concealing the emergence thereof from the wall and indeed minimizing cable visibility generally.

The invention has been primarily conceived for use with relatively small (maximum dimensions about 20 cm×15 cm×10 cm) loudspeakers of the sort used in the home theatre or home cinema context. However the expressions "and the like" and "etc" in this patent specification are intended to provide cover for use of a wall bracket in accordance with the invention with such other electrical/electronic items of equipment as movement detectors, cameras and video recorders and projectors, security and wall lights, and even personal computer monitors and televisions.

A particular embodiment of the present invention will now be described by way of example with reference to the accompanying drawings, of which:—

Figure 2:
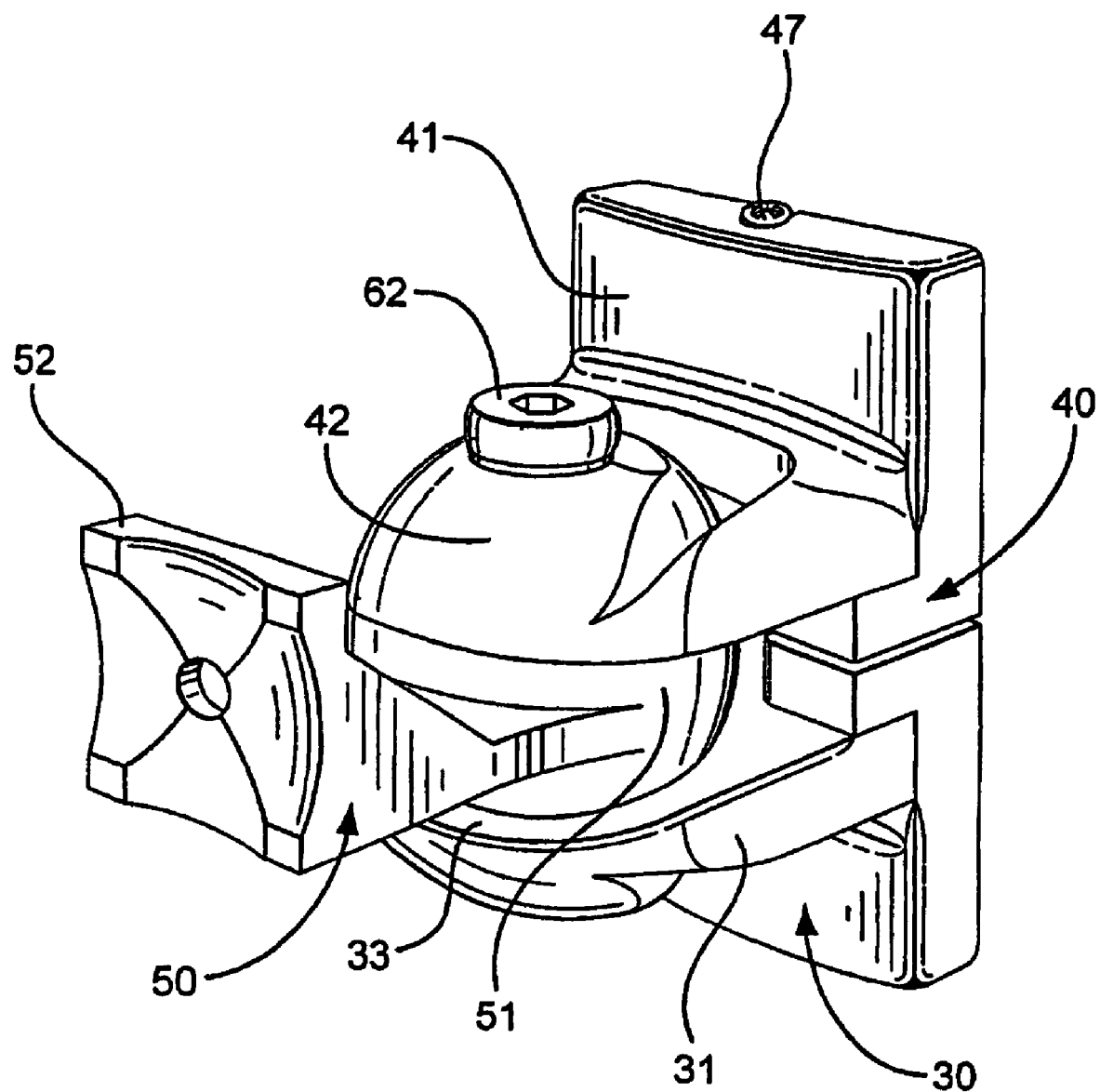

FIG. 1 is an exploded view of a wall bracket in accordance with the invention, and FIG. 2 is an isometric view of an assembled wall bracket.

The wall bracket shown in the drawings comprises a wall plate 20, a lower bracket base member 30, an upper bracket base member 40, a bracket mount member 50, a bolt 60 and an adapter 70.

The wall plate 20 is a metal plate with two raised flanges 21a, 21b projecting laterally outwards, wall fixing holes 22, a centrally disposed cable management hole 23, and a grub screw threaded anchor hole 24.

The lower bracket base member 30 comprises a housing 31 incorporating grooves 32 arranged for engagement with the wall plate flanges 21a, 21b, and a jaw member 33. The jaw member 33 is integral with the housing 31 and has a substantially hemispherical socket 34 with a central hole 35 therethrough for the bolt 60. This hole 35 holds a nut (not shown) for the bolt 60. The jaw member 33 faces longitudinally of the member 30. Pins 36 in the housing are arranged to engage in holes (not shown) in the lower bracket base member 30.

The upper bracket base member 40 comprises a housing 41 incorporating grooves (not shown) similar to those 32 in the member 30, and a jaw member 42 integral with the housing 41. The jaw member includes a substantially hemispherical socket matching the socket 34 and which in use will oppose and co-operate with the socket 34. There is a central hole 43 through the socket for the bolt 60. There is a grub screw 47 centrally in the upper face of the housing 41, for engaging with the anchor hole 24 in the wall plate 20. The housing 41 extends a short way upward of the jaw member 42, to allow the cabling to be routed therethrough.

The bracket mount member 50 comprises a mounting ball 51 and a bracket 52 integral with the ball 51. The ball 51 is of similar radius to the sockets in the base members 30 and 40 and is arranged for being captured and gripped therebetween. The ball 51 has a slot 53 therethrough for the bolt 60. The slot 53 permits the member 50 to be held in a variety of configurations with respect to the members 30, 40. The bracket 52 is formed with two saddles 52a, 52b normal one to the other, and a central hole 54 for the attachment of a loudspeaker (not shewn).

The adapter 70 is a plate with a central hole 71 for attachment thereof to the bracket 52 at the hole 54 and two outlying holes 72 for attachment to a loudspeaker or the like.

For using the wall bracket shown in the drawings the wall plate 20 is attached to a wall in a desired location and cabling, terminating in a plug/socket, is brought through the central hole 23. The loudspeaker is offered to and attached to the bracket 52 via the hole 54. The upper bracket member 40 is via the grooves 32, slid onto the flanges 21a, 21b of the wall plate 20 and while held in position, perhaps via the grub screw 47 being screwed into hole 24 in the plate 20, the ball 51, nestling in the socket of the lower base member 30 is offered to the lower socket 34, the lower base member 30 being slid onto the flanges 21a, 21b. The bolt 60 is then passed through the jaws and the ball 51 and tightened with the loudspeaker held in the desired configuration. The electrical connection is then made.

The above described modus operandi is particularly suitable for small loudspeakers having a rounded back. Flat backed loudspeakers can be attached to the wall bracket using the adapter 70.

The invention claimed is:

1. A wall bracket for supporting a loudspeaker and comprising:
   a wall plate arranged for attachment to a home wall, the wall plate having a pair of raised flanges, one at each side thereof, projecting laterally outwards therefrom;
   upper and lower bracket base members defining grooves arranged to slide onto said flanges and defining substantially hemispherical sockets and being constructed to embrace said wall plate;
   a bracket mount comprising a mounting ball and a bracket arranged for attachment to the loudspeaker, the mounting ball having similar radius to the hemispherical sockets and being arranged for being captured and gripped therebetween and being pierced by a slot therethrough; and
   a bolt deployable through the sockets and the slot in the mounting ball to clamp the upper and lower base members together around both the wall plate and the mounting ball, the slot being arranged to permit the bracket mount to be held in a variety of inclinations with respect to the wall plate.

2. A wall bracket as claimed in claim 1 and having a grub screw and wherein the wall plate has an upper flange arranged for the grub screw to screw therein, the upper bracket base member being so pierced as to enable the grub screw to lock said upper base member to said wall plate.

3. A wall bracket as claimed in claim 2 and wherein said bracket mount has a concave mounting surface, whereby it is adapted for holding a body with curved or flat rear or side surfaces.

4. A wall bracket as claimed in claim 1 and wherein the flanges are in parallel array.

5. A wall bracket as claimed in claim 1 and wherein said upper and lower bracket base members have interfitting members whereby said bracket base members can be manually held together, with the ball in place, while the wall bracket is assembled.

6. A wall bracket as claimed in claim 1 and wherein said bolt has an enlarged head to enable it to be finger tightened.

7. A wall bracket as claimed in claim 1 and wherein said bracket mount has two mounting saddles, one normal to the other, whereby it is adapted to carry a body with curved or flat rear or side surfaces.

8. A wall bracket as claimed in claim 1 and wherein said bracket mount incorporates holes or slots for attachment of the body.

9. A wall bracket as claimed in claim 1 and wherein the wall plate defines a cable management hole wherethrough cabling for the body can be routed.

10. A wall bracket as claimed in claim 1 and adapted for use in a domestic context.

11. Use of a wall bracket according to claim 1 in a home theatre or home cinema context.

* * * * *